(12) United States Patent
Büssow et al.

(10) Patent No.: US 7,302,366 B2
(45) Date of Patent: Nov. 27, 2007

(54) MEASURING INSTRUMENT

(75) Inventors: Jürgen Büssow, Duisburg (DE); Günter Musiol, Duisburg (DE)

(73) Assignee: Krohne Messtechnik GmbH & Co. KG, Duisburg (DE)

( * ) Notice: Subject to any disclaimer, the term of this patent is extended or adjusted under 35 U.S.C. 154(b) by 0 days.

(21) Appl. No.: 11/374,576

(22) Filed: Mar. 13, 2006

(65) Prior Publication Data
US 2006/0248951 A1 Nov. 9, 2006

(30) Foreign Application Priority Data
May 3, 2005 (DE) .................... 10 2005 021 000

(51) Int. Cl.
*G06F 17/40* (2006.01)
*G06F 19/00* (2006.01)

(52) U.S. Cl. ............ 702/189; 340/870.01; 340/870.28; 340/870.29; 702/42; 702/127

(58) Field of Classification Search .......... 340/870.01, 340/870.28, 870.29; 356/432; 702/45, 127, 702/189, 190, 191
See application file for complete search history.

(56) References Cited

U.S. PATENT DOCUMENTS

| 2,689,949 | A | * | 9/1954 | Kalbach et al. ........ 340/870.13 |
| 3,461,384 | A | * | 8/1969 | Bayati et al. .................. 324/96 |
| 3,503,061 | A | * | 3/1970 | Bray et al. ............. 340/870.07 |
| 4,531,193 | A | * | 7/1985 | Yasuhara et al. ........... 702/183 |
| 4,831,558 | A | * | 5/1989 | Shoup et al. ............... 702/188 |
| 6,094,622 | A | * | 7/2000 | Hubbard et al. ............. 702/61 |
| 6,374,188 | B1 | * | 4/2002 | Hubbard et al. ............. 702/61 |
| 6,427,129 | B1 | | 7/2002 | Lalla |
| 6,441,747 | B1 | * | 8/2002 | Khair et al. ........... 340/870.16 |
| 6,507,794 | B1 | * | 1/2003 | Hubbard et al. ............. 702/60 |
| 6,577,961 | B1 | * | 6/2003 | Hubbard et al. ............. 702/60 |
| 7,039,529 | B2 | * | 5/2006 | Keech ......................... 702/45 |
| 2006/0190458 | A1 | * | 8/2006 | Mishina et al. ............... 707/10 |
| 2006/0248951 | A1 | * | 11/2006 | Bussow et al. ........... 73/290 R |

FOREIGN PATENT DOCUMENTS

| DE | 10040905 | 3/2002 |
| DE | 10161401 | 6/2003 |
| GB | 2265985 A | 10/1993 |

* cited by examiner

*Primary Examiner*—Edward R Cosimano
(74) *Attorney, Agent, or Firm*—Cesari & McKenna LLP

(57) ABSTRACT

A measuring instrument, in particular a flow or level meter, includes a base module for the acquisition and processing of measured data and an add-on module. Both the base module and the add-on module feature an optical interface interconnecting the base module and the add-on module. The result is a measuring instrument which, by interchanging the add-on module, can be equipped with various external interfaces without requiring any recalibration of the measuring instrument.

10 Claims, 3 Drawing Sheets

MEASURING INSTRUMENT

This invention relates to a measuring instrument and in particular to a flow meter or level meter incorporating a base module for the acquisition and processing of measured data.

BACKGROUND OF THE INVENTION

Industrial measuring instruments such as flow or level meters serve to collect data such as volume or mass flow or fill level values. In general, however, they do not provide a direct read-out of the value of interest, i.e. of the volume or mass flow or of the fill level. Instead, the acquired data represent information for instance on the lift height of a float in a float-type flow meter, the intensity of an induced current in a magnetoinductive flow meter or the run time of a radar signal in a radar-type level meter. In fact, if for instance in a float-type flow meter, the lift height of the float is detected via a trailing magnet, then even the lift height determination of the float is indirect only, i.e. in the form of flux-density information that must then be correlated with the volume flow concerned.

The data thus acquired must therefore be processed, i.e. converted in order to yield a signal that indicates the actual value of interest such as the flow rate or the fill level. This requires linearization of the collected initial data on the basis of predefined calibration parameters. It follows that prior to any industrial application, the measuring instrument concerned must be calibrated based on the parameters predefined for the linearization so that in an actual measuring operation, each directly acquired datum can be unambiguously translated into an appropriate flow or level value.

In the case of the flow and level meters referred to above as examples, the flow or level value thus measured is fed to a display or output device. Typical displays are of an analog or digital design and are often mounted directly on the measuring instrument. But then again, it is often desirable to display and/or further process the measured values at a remote location. To that effect, the measuring instrument is usually equipped with an interface through which the measuring instrument outputs the measured data, typically in the form of a test voltage or test current. The type of interface and the manner in which the data are transferred are generally defined by the protocol or bus system used. Examples include the signal transmission, as a current signal of between 4 and 20 mA, via a two-wire circuit, a HART, PROFIBUS, FOUNDATION FIELDBUS, etc.

There is a problem in that a measuring instrument is usually equipped with only one type of interface for the data transmission, so that a change of the system in which the measuring instrument is integrated requires either a complete replacement of the measuring instrument or, if the measuring instrument is modified with a new interface, at least one recalibration. That is time-consuming and expensive.

SUMMARY OF THE INVENTION

Against that background, it is the objective of this invention to introduce a measuring instrument that permits universal and simple operation with a variety of interface systems.

For a measuring instrument as described above, this objective is achieved by providing the data acquisition and processing base module with an add-on module and by equipping both the base module and the add-on module with an optical interface interconnecting the base module and the add-on module.

The invention thus provides for the measuring instrument to feature a base module that serves to perform the actual data acquisition and processing functions, and an optical interface by way of which the processed data can be transferred to the add-on module. This permits the use of a variety of add-on modules, each adapted for a different purpose and, specifically, each equipped with a different external interface through which the output of the measured data can take place corresponding to such standards as the aforementioned HART, PROFIBUS, FOUNDATION FIELDBUS etc.

A preferred design embodiment of the invention specifically includes the ability of the base module to recognize the type of add-on module employed, causing the base module to transfer to the add-on module, via the optical interface, only such data as are earmarked for that particular add-on module and are to be forwarded from there, displayed or fed to an output device.

In a preferred, enhanced embodiment of the invention, the base module is additionally provided with a linearization unit in which the acquired data are linearized on the basis of the predefined calibration parameters. This permits the transfer of prelinearized data to the add-on module so that, prior to the industrial use of the measuring instrument according to this invention, only one single calibration is needed, that being the calibration of the base module, allowing for the subsequent use of different add-on modules while obviating the need for a recalibration of the measuring instrument whenever there is a change in the type of add-on module.

Apart from different external interfaces, it is also possible to provide add-on modules with various additional functions and/or displays. For example, one preferred embodiment of the invention employs add-on modules with counters and/or with a visual display.

In general, it is possible to equip the base module with nothing more than the optical interface for transferring data to the add-on module. In a preferred embodiment of the invention, however, the base module is provided with an additional interface for outputting the acquired data and/or for setting the parameters of the base module. Specifically, the base module can include a two-wire signal output port and/or a bus interface such as a HART interface.

The fact that the data transfer between the base module and the add-on module takes place via the above-mentioned optical interface offers several advantages. First, very large data transfer rates of up to 100 kBits are attainable. Second, it permits reliable electrical separation between the base module and the add-on module. For example, the base module may be positioned parallel to the add-on module at a distance of about 10 mm, and a distance of about 5 mm between the fiber-optic cables used for the optical interface has been found to work well.

In general, it is also possible to feed power to the base module from a separate energy source. In a preferred embodiment of the invention, however, the base module is powered via the external interface of the add-on module. In this case, there is also an electric wire connection between the base module and the add-on module through which the electric power available, for instance in a bus system, is also made available to the base module which is not itself connected to the bus system.

There are numerous ways in which the measuring instrument according to this invention can be configured and expanded. In this context, attention is invited to the dependent claims and to the following detailed description of preferred embodiments of the invention with reference to the accompanying drawings.

DETAILED DESCRIPTION OF ILLUSTRATIVE EMBODIMENTS

Figure 1:
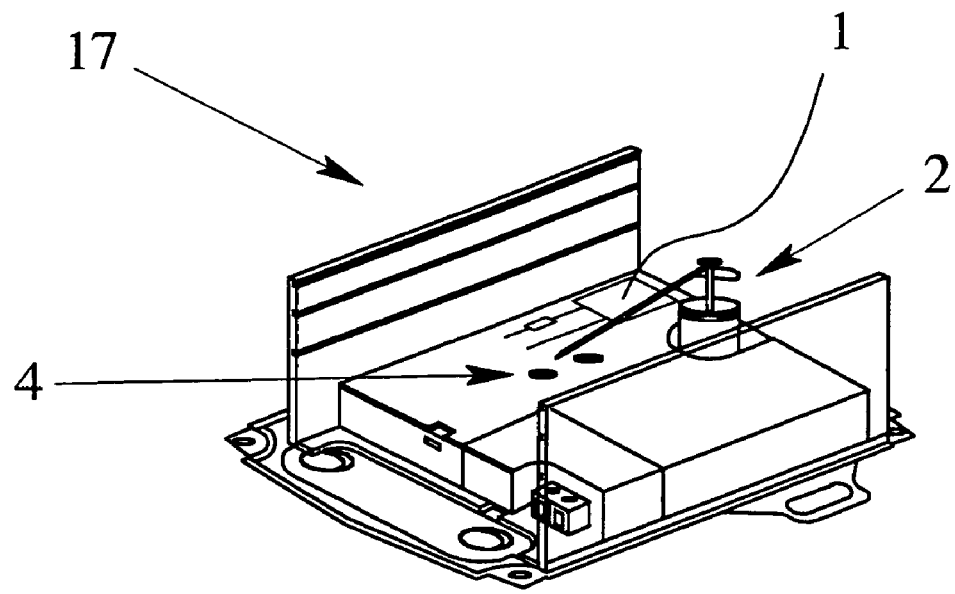
FIG. 1 depicts the data transducer of a float-type flow meter according to a preferred embodiment of the invention, with a perspective view of the base module.

FIG. 1 is a perspective view of the data transducer, including its base module 1, of a float-type flow meter according to a preferred embodiment of the invention. The transducer includes a pointing device 2 which, as in conventional art, uses a magnetic coupling to indicate the lift height of the float, not illustrated, of the float-type flow meter. The pointing device employs a graduated dial 3, depicted in FIGS. 2 and 3, and provides an analog direct-reading indication of the volume flow rate.

In addition, the base module 1 is equipped with an optical interface 4, permitting a data exchange by the half-duplex method. To that end, the optical interface 4 incorporates a transmitter 13 and, spatially separated from the latter, a receiver 14. As can also be seen in FIG. 2, the transducer in embodiment of the invention here described features above the base module 1, at a distance from the latter, an add-on module 5 that extends parallel to the base module 1 and is on its part equipped with an optical interface 6 including a transmitter 15 and a receiver 16. In this fashion, the base module 1 will be able to identify the type of the add-on module 5 concerned while making it possible for the base module 1 to transmit the data of interest to the add-on module 5. Specifically, this means that data which are not intended for further processing or transfer by the add-on module 5 are not sent from the base module 1 to the add-on module 5 in the first place.

The base module 1 incorporates a linearizing unit by means of which it is possible, through a linearization process based on predefined calibration parameters, to mathematically convert the lift height data of the float, captured via the magnetic coupling thereof, into volume flow rates. It follows that the optical interface 4 of the base module 1 transfers data that are prelinearized and thus provide direct volume flow rate information, obviating the need for any linearization and corresponding calibration that would depend on the add-on module 5 employed.

Figure 3:
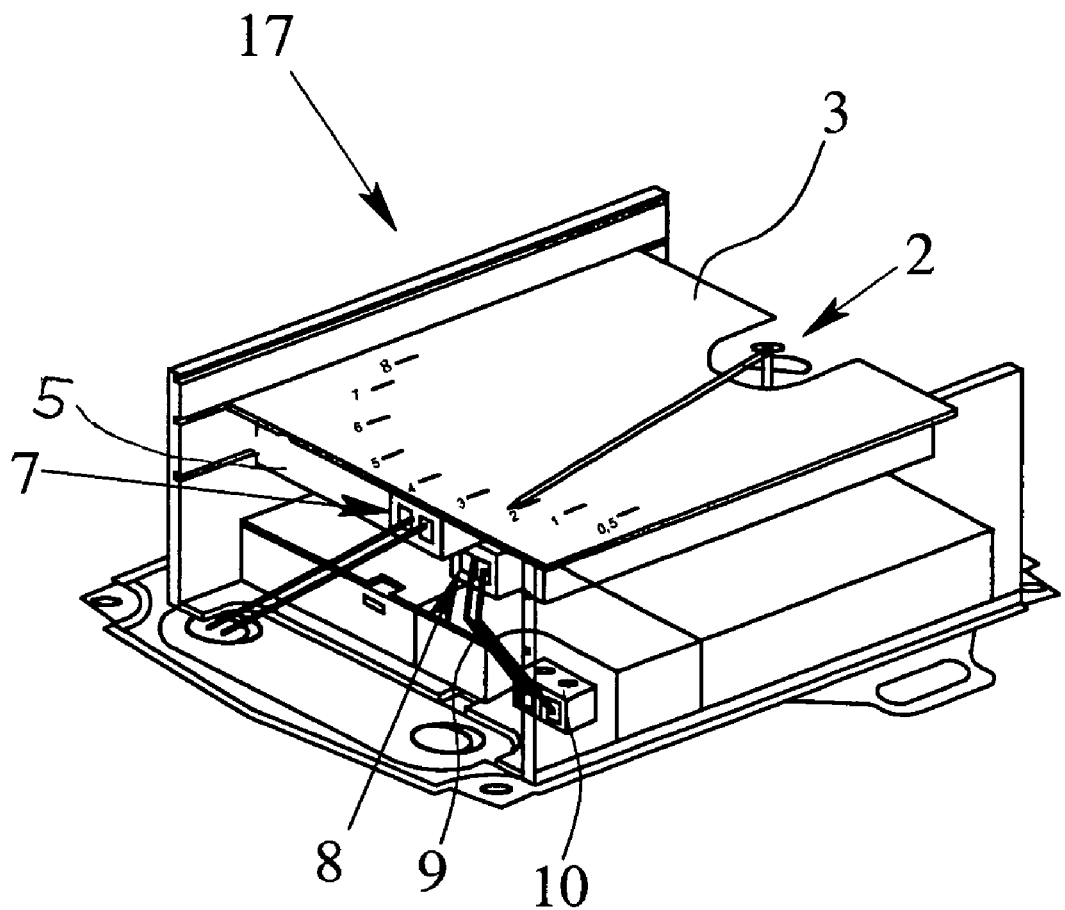
FIG. 3 is a perspective view of the transducer with the basic and add-on modules.

The flow rate information transferred to the add-on module 5 can now be output via an external interface 7 on the add-on module 5 shown in FIG. 3, compliant with a standard such as PROFIBUS or FOUNDATION FIELDBUS. Moreover, in the preferred embodiment of the invention here described, the base module 1 receives electric power from the add-on module 5 by way of a power output 8, a feed line 9 and a power input port 10. This makes a dedicated power supply for the base module 1 unnecessary.

FIGS. 4 a and 4b illustrate a data transducer according to another preferred embodiment of the invention. This transducer again includes a base module 1 and an add-on module 11 with optical interfaces 4 and 6 and, in terms of its basic functions, it is designed like the transducer described with reference to FIGS. 1 to 3 except that, as an alternative, it may be provided with a different external interface. Also, the add-on module additionally includes a totalizing counter with a corresponding display 12.

Figure 2:
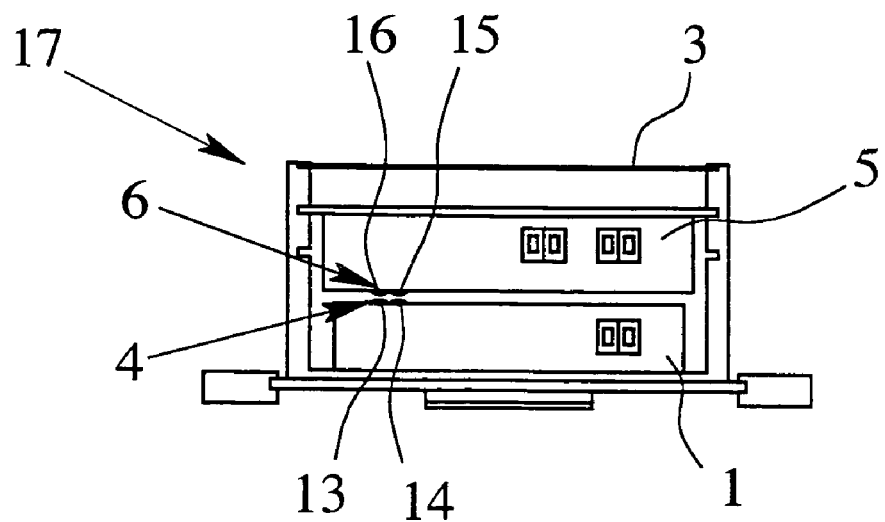
FIG. 2 is a schematic illustration showing the placement of an add-on module complementing the transducer depicted in FIG. 1.
Figure 4A:
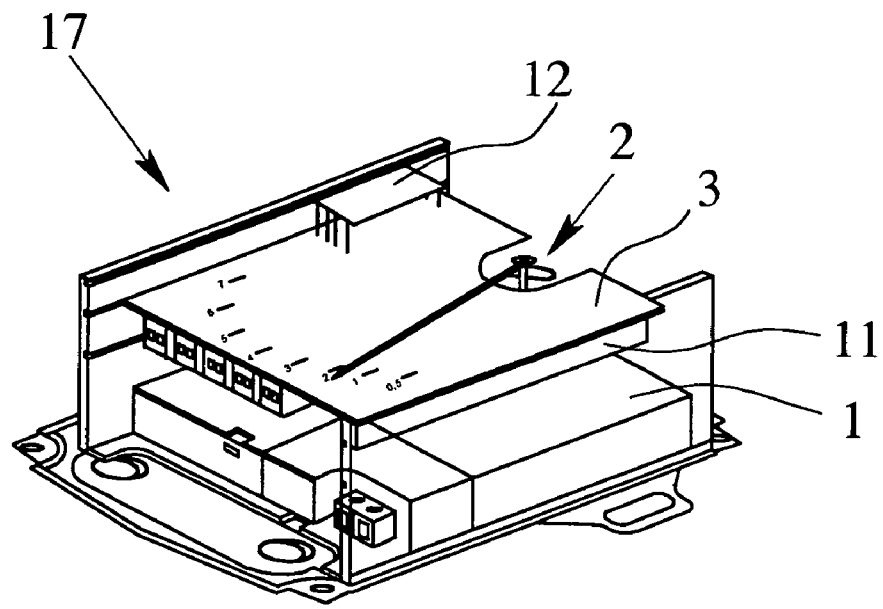
FIGS. 4a and 4b are views similar to FIGS. 1 and 2 showing another preferred embodiment of the invention.
Figure 4B:
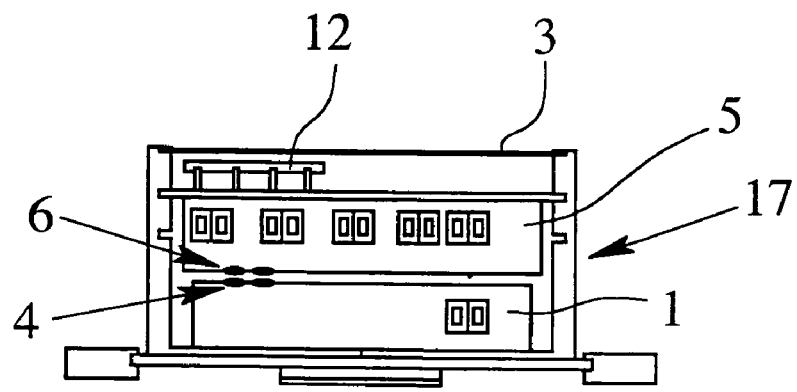

A significant feature of this invention embodiment consists in the fact that the transducer shown in FIGS. 4a and 4b can be derived in simple fashion from the transducer shown in FIGS. 1 to 3 by merely substituting the add-on module 11 for the add-on module 5. As a key advantage, the "new" measuring instrument employing the changed transducer does not require any recalibration of the measuring instrument. Moreover, each add-on module 5, 11 receives prelinearized measuring data, meaning that the complete "intelligence" of the measuring instrument is implemented in the base module 1, whereas the add-on module 5 or 11 only serves to permit the required post-processing and/or the forwarding of the data in the appropriate protocol and/or bus systems.

Finally, it should be pointed out that the base module 1, the selected add-on module 5, 11 and the graduated dial 3 will always be installed in a uniform housing 17 in which the base module 1 and the selected add-on module 5, 11 can be positioned parallel to and at a distance from each other in such fashion that the optical interfaces 4, 6 permit a data exchange while ensuring reliable electrical separation. As a result, the measuring instrument as seen from the outside will always appear to be the same while, depending on the add-on module selected, i.e. 5 or 11, it offers different functionalities especially with regard to any further data transfer via an external interface, as well as certain other functional capabilities.

We claim:

1. A measuring instrument, in particular a flow or level meter, comprising a base module for the acquisition and processing of measured data and an add-on module which is equipped with an external interface permitting the output of said data, said base module and said add-on module being equipped with an optical interface through which the base module and the add-on module are interconnected, wherein the base module has the ability to recognize the type of add-on module employed, causing the base module to transfer to the add-on module, via the optical interface, only such data as are earmarked for that particular add-on module and are to be forwarded from there, displayed or fed to an output device.

2. The measuring instrument as in claim 1, wherein said data can be transferred from the base module to the add-on module via said optical interface.

3. The measuring instrument as in claim 1 or 2, wherein the base module includes a linearizing unit in which said data are linearized as a function of predefined calibration parameters.

4. The measuring instrument as in claim 1 or 2, wherein the add-on module is provided with a display permitting the read-out of said data.

5. The measuring instrument as in claim 1 or 2 wherein the base module includes an additional interface for outputting said data and/or for setting the parameters of the base module.

6. The measuring instrument as in claim 5, wherein the base module includes a two-wire signal output.

7. The measuring instrument as in claim 5, wherein the base module includes a bus interface.

8. The measuring instrument as in claim 1 or 2, wherein the base module and the add-on module are positioned next to and at a distance from each other in such fashion that a reliable electrical separation between the base module and the add-on module is obtained.

9. The measuring instrument as in claim 1 or 2, including means for feeding electric power to the base module via the external interface of the add-on module.

10. The measuring instrument as in claim 1 or 2, wherein the add-on module is interchangeable with a second add-on module.

* * * * *